Patented Oct. 29, 1946

2,410,197

UNITED STATES PATENT OFFICE 2,410,197

TETRAHYDROPYRROLE ALCOHOL ESTERS OF HALOGEN SUBSTITUTED CARBOXYLIC ACIDS

Joseph N. Borglin, Wilmington, Del., assignor to Hercules Powder Company, Wilmington, Del., a corporation of Delaware No Drawing. Application May 23, 1941, Serial No. 394,880

4 Claims. (Cl. 260—313)

This invention relates to a series of new compounds, more particularly it relates to esters of heterocyclic alcohols and certain carboxylic acids. It also relates to a method for preparing the compounds.

In accordance with this invention esters of heterocyclic organic alcohols, particularly those containing oxygen, sulfur or nitrogen in the position of a cyclic atom, and halogen substituted organic carboxylic acids are provided by a process which comprises reacting a heterocyclic alcohol with a halogen substituted esterification agent which may be a halogen substituted carboxylic acid, a halogen substituted carboxylic acid anhydride or a halogen substituted carboxylic acid halide. The compounds formed by this method have the formula ROOCR'X, in which R is the radical of a heterocyclic alcohol, in which R' is an organic radical (i. e., an aliphatic, alicyclic, heterocyclic or aromatic radical), and in which X is chlorine, bromine, iodine or fluorine.

The organic heterocyclic alcohol which is utilized in the method according to this invention will have in its structure a cycle consisting of carbon atoms and one or more atoms of other elements and will carry an esterifiable hydroxyl group. However, simple substances which are crystallizable upon chilling to their solidification points as distinguished from highly polymeric complex or colloidal materials which do not form crystals upon solidification are meant by the term alcohol; the alcohol will thus have a molecular weight of less than 500. Heterocyclic alcohols with oxygen, sulfur or nitrogen cyclic atoms are particularly useful. The following alcohols are examples: furfuryl alcohol, tetrahydrofurfuryl alcohol, methylfurfuryl alcohol, tetrahydromethylfurfuryl alcohol, monoethyloldioxane, methyloldioxane, methylolmorpholine, beta-methylolcoumarone, thienyl alcohol, beta-methylolthiophine, alpha-methylol rhodim tetrahydropyrrole alcohol, pyrrole alcohol, isatin, beta-methylolpyrazole and the like.

Suitable halogen substituted acylating or esterification agents which are utilized are the halogen substituted carboxylic acids such as, for example, monochloroacetic acid, dichloroacetic acid, trichloroacetic acid, alpha-chloropropionic acid, beta-chloropropionic acid, dichloropropionic acid, alpha-, beta- or gammachlorobutyric acid, dichlorobutyric acid, chlorobenzoic acid, chlorophthalic acid, chlorolauric acid, chloromyristic acid, chlorostearic acid, chloroleic acid, chlororicinoleic acid, chloromalonic acid, chloronaphthenic acid, chlorofuroic acid and the corresponding bromine, iodine and fluorine substituted acids. These may be mixed if desired. Acid anhydrides of the halogen substituted carboxylic acid may be used as esterification agents instead of the acids themselves. Acid halides, particularly acid chlorides, and acid bromides of halogen substituted organic carboxylic acid such as those named are also suitable as esterification agents. However, when using acid halides of this nature, it is preferable to include in the reaction mixture an acid acceptor, for example, pyridine or similar tertiary amines to take up hydrochloric acid, hydrobromic acid, etc., formed in the reaction.

The esters in accordance with this invention are prepared by reacting the heterocyclic alcohol utilized with the esterification agent utilized at a temperature between about 0 and about 200° C. until the reaction is substantially completed. If desired, inert solvent media such as benzene, toluene, carbon tetrachloride, chloroform, and the like, may be present. In most cases, it will be convenient to use a reaction solvent medium and to carry out the reaction at the boiling point of the reaction mixture under reflux conditions thereby utilizing the reaction solvent to maintain the temperature at the desired level. Toluene, benzene and the like may be utilized in this manner to provide an azeotropic distillation to remove water where this is formed in the reaction. Where a halogen substituted carboxylic acid is used as the esterification agent, the temperature will preferably be maintained between about 70 and about 120° C. during the reaction. Where acid anhydrides are utilized somewhat lower temperatures, for example, temperatures between about 50° C. and about 150° C. are preferred. In the case of acid halides the preferred temperature is between about 20° C. and about 150° C.

An esterification catalyst may be included in the reaction mixture, if desired. Small quantities of sulfuric acid, perchloric acid, zinc chloride and the like are suitable, or such basic catalysts as sodium acetate, sodium propionate, pyridine, aniline hydrochloride, etc., may be utilized. The presence of pyridine is particularly valuable in those cases where acid halides are utilized. Where the heterocyclic alcohol utilized has some tendency to polymerize, as is the case with such materials as furfuryl alcohol, pyrrole alcohol, it is desirable to utilize only such catalysts as have no polymerizing tendency upon the alcohol. Under conditions where polymerizing alcohols are utilized, it is desirable to use an acid anhydride as the esterification agent in the presence of a mildly basic catalyst such as sodium acetate, pyridine and the like, and preferably a medium such as pyridine will be utilized.

Preferably, the reaction will be carried out in an inert atmosphere such as that provided by carbon dioxide, hydrogen, nitrogen, helium, etc., in order that the lightest possible color may be obtained in the product.

After the reaction has been completed, which will usually be between about 2 and about 24 hours, depending upon the temperature utilized, the product may be recovered from the reaction mixture. In cases where the ester formed is freely soluble in a solvent which is immiscible with water, i. e., benzene, hexane, butyl acetate and the like, such a solvent may be added in excess and the reaction mixture washed with water to remove acidic material. Volatile material may then be removed by vacuum distillation. However, where the product is freely soluble in water, vacuum distillation of the reaction mixture is preferred to separate its components.

The method in accordance with this invention will be further illustrated by the examples which follow. All parts and percentages are by weight unless otherwise specified.

Example 1

Four hundred parts of tetrahydrofurfuryl alcohol were reacted with 300 parts of chloroacetic acid at a temperature of 120° C. for 18 hours. The resulting reaction mixture was then vacuum distilled. The first fraction distilling over (25° C.–108° C.) consisted of unreacted alcohol, water and decomposition products and the fraction was discarded. The desired material distilled at 108–130° C. and comprised 475 parts of a water-white liquid with a combined chlorine content of 18.9%. This product consisted essentially of tetrahydrofurfuryl chloroacetate.

Example 2

One hundred fifty parts of thienyl alcohol were reacted with 140 parts of chloroacetic acid at 120° C. for 8 hours. The resulting reaction mixture was vacuum distilled, the first fraction representing undesired volatile material and the second fraction representing the desired thienyl chloroacetate. The second fraction distilled had a chlorine content of 16.8%.

Example 3

One hundred parts of monomethyloltetrahydropyrrole and 94 parts of chloroacetic acid were reacted in toluene under azeotropic refluxing with removal of water in the distillate for 10 hours. The resulting product was then water washed and the toluene removed from the toluene solution resulting by heating under vacuum. Monomethyloltetrahydropyrrole chloroacetate analyzing 17% chlorine was obtained in this manner.

Example 4

Four hundred parts of tetrahydrofurfuryl alcohol were reacted with 275 parts of chloroacetic anhydride for six hours at 130° C. under a blanket of carbon dioxide. More volatile components were then vacuum distilled until no more acidic material came over. The tetrahydrofurfuryl chloracetate was then vacuum distilled for recovery.

Example 5

Four hundred parts of tetrahydrofurfuryl alcohol were treated with a mixture of 360 parts of chloroacetyl chloride and 360 parts of pyridene for 18 hours at 135° C. while blanketed with carbon dioxide. The reaction mixture was then shaken with soda ash, filtered and vacuum distilled to remove materials more volatile than the chloroacetate ester formed. A furfuryl chloroacetate fraction was then vacuum distilled from the residue.

The products in accordance with this invention are useful as intermediates, for example, they may be reacted with metal thiocyanates to form thiocyano derivatives and with ammonia to form amino derivatives. The esters are useful per se as solvents of the very slow evaporating type or as plasticizers in plastic and lacquer applications of chlorine containing organic film forming materials such as chlorinated rubber.

It will be understood that the details and examples hereinbefore set forth are illustrative only and that the invention as broadly described and claimed is in no way limited thereby.

What I claim and desire to protect by Letters Patent is:

1. An ester of a halogen substituted carboxylic acid and a heterocyclic alcohol selected from the group consisting of tetrahydropyrrole alcohol and monomethyloltetrahydropyrrole.

2. An ester of a halogen substituted aliphatic carboxylic acid and a heterocyclic alcohol selected from the group consisting of tetrahydropyrrole alcohol and monomethyloltetrahydropyrrole.

3. An ester of a chlorine substituted aliphatic carboxylic acid and a heterocyclic alcohol selected from the group consisting of tetrahydropyrrole alcohol and monomethyloltetrahydropyrrole.

4. A monomethyloltetrahydropyrrole chloroacetate having the formula:

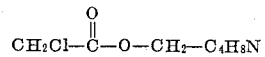

JOSEPH N. BORGLIN.